United States Patent [19]
Peterson

[11] Patent Number: 5,640,800
[45] Date of Patent: Jun. 24, 1997

[54] CRAB TRAP

[76] Inventor: Fredric N. Peterson, 3020 NE. 99th, Vancouver, Wash. 98662

[21] Appl. No.: 451,710

[22] Filed: May 26, 1995

[51] Int. Cl.⁶ .......................... A01K 69/00; A01M 23/34
[52] U.S. Cl. .................................. 43/100; 43/87
[58] Field of Search .................. 43/100, 102, 87

[56] References Cited

U.S. PATENT DOCUMENTS

| | | | |
|---|---|---|---|
| 2,565,163 | 8/1951 | Ball | 43/43.1 |
| 2,656,642 | 10/1953 | Richa | 43/100 |
| 2,793,466 | 5/1957 | Esposito | 43/100 |
| 3,815,276 | 6/1974 | Harrison | 43/43.1 |
| 4,083,142 | 4/1978 | Gregerson | 43/87 |
| 4,216,607 | 8/1980 | Lyster | 43/48 |
| 4,271,625 | 6/1981 | Archer | 43/87 |
| 4,697,381 | 10/1987 | Esgro et al. | 43/100 |
| 5,157,864 | 10/1992 | Kuroda et al. | 43/100 |
| 5,174,059 | 12/1992 | Durbin | 43/100 |
| 5,340,120 | 8/1994 | Holyoak | 273/447 |

*Primary Examiner*—Kurt Rowan
*Attorney, Agent, or Firm*—Marger, Johnson, McCollom & Stolowitz, P.C.

[57] ABSTRACT

A crab trap having a tubular body formed of a netting material, a bait compartment in the tubular body, a weight compartment, and one or more looped snares which close about the leg or claw of the crab when the trap is lifted. The openings in the netting are sized to allow the crab to partially insert its claw into the bait compartment, but to resist withdrawal of the crab's claw.

8 Claims, 1 Drawing Sheet

CRAB TRAP

BACKGROUND OF THE INVENTION

This invention provides an improved crab trap. Crabs have long been considered a delicacy by many people. It turns out that crabs inhabit numerous tidal waters which can be readily accessed from the shore, bridges, docks, or small boats. This fortunate happenstance, along with the crab's propensity to feed on many types of flesh and artificial baits, has sparked the invention of numerous crab traps designed to enable crab lovers to more readily harvest their prize.

Crab traps of the type most pertinent to the present invention are disclosed in U.S. Pat. Nos. 5,174,059 to Durbin; 5,157,864 to Kuroda et al; 4,697,381 to Esgro et al; 4,271,625 to Archer; 4,216,607 to Lyster; and 3,185,276 to Harrison. The crab traps disclosed in each of those patents rely on flexible loops of fishing line to snare one or more legs of the crab. In each instance, the crab is lured to the ensnaring loops by a bait which is affixed to the trap. In the traps disclosed in Kuroda et al, Lyster, and Harrison, the bait is impaled on a fish hook or a bait rod. In Esgro et al and Archer, the bait is held by a loop or otherwise tied to a central frame member of the trap. In Durbin, the bait is contained within a rigid central wire cage. The wire cage has upper and lower halves which are held together by a central axial bolt and nut.

Each of these traps share a common feature which limits its effectiveness at snaring crabs. Each relies exclusively on the line loops to ensnare the crab. As taught in each of these patents, the line loop normally does not snare the crab until the operator lifts the trap. As will be appreciated by those with experience in crabbing, crabs can move very quickly if startled. As a result, when the lead line attached to the crab trap is first pulled to retrieve the trap, the initial movement of the crab trap can alarm the crab while at the same time not be quick enough to snare the crab. Moreover, the line loop may not firmly ensnare the crab if, for example, it is positioned near the end of the crab's leg.

A need remains therefore, for an improved crab trap which is capable of more reliably catching this tasty crustacean, and which renders academic the extreme distress which normally accompanies any failure to satiate a hopeful crab lover's appetite.

SUMMARY OF THE INVENTION

The present invention is embodied in a more reliable crab trap comprising an upper frame member, a median frame member, and a bait compartment defined by a first portion of resilient netting. The resilient netting has openings sized to allow a crab to insert one "finger" of its claw only part way into the bait compartment, but which does not allow ready extraction of the crab's claw.

DETAILED DESCRIPTION

Figure 1:
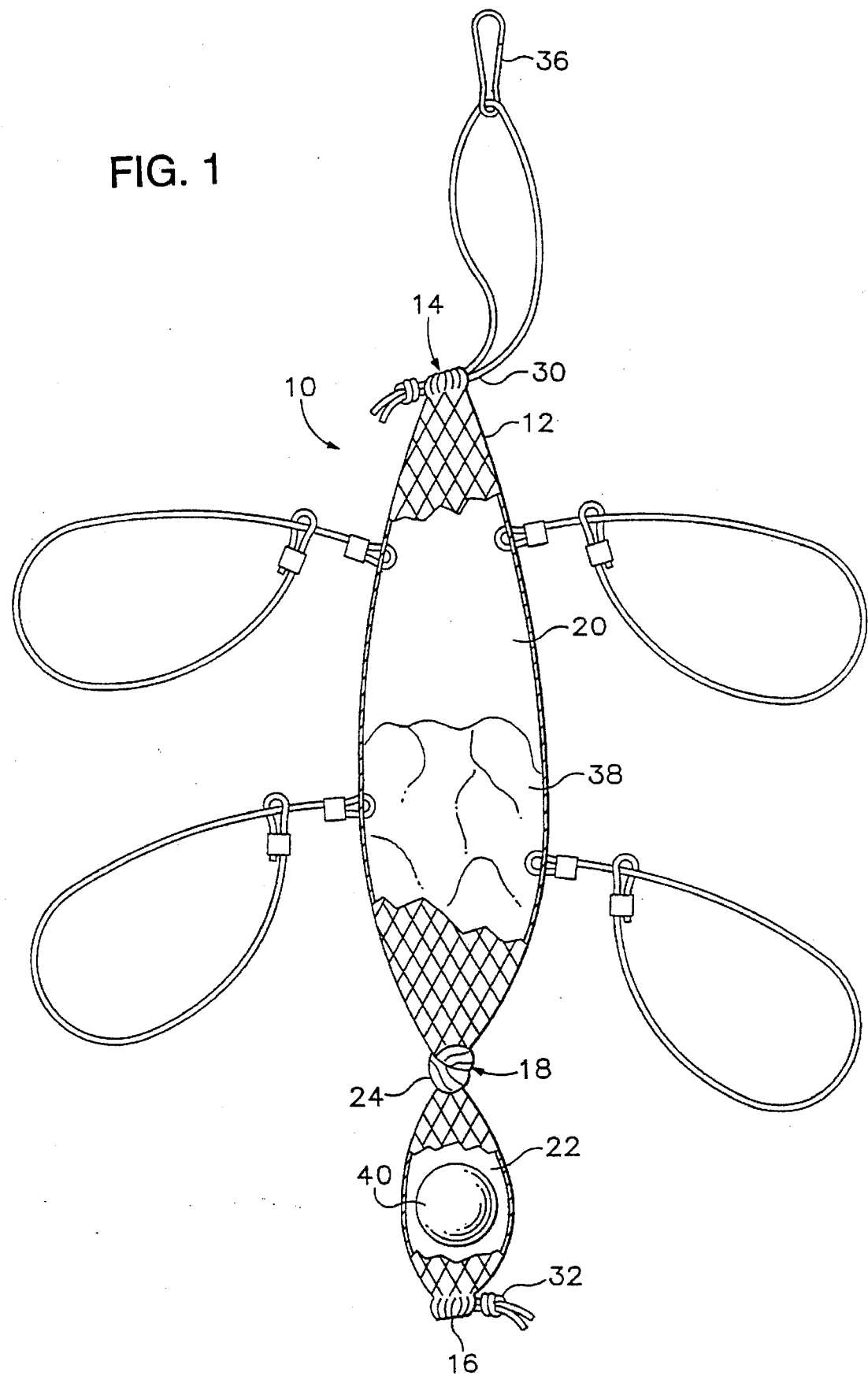
FIG. 1 is partial cutaway, elevational view of a crab trap according to the present invention.

Referring now to the FIG. 1, a crab trap according to the present invention is shown generally at 10. Trap 10 consists of tubular body 12 which is formed of a polymeric netting, preferably of nylon, although any suitable material will suffice. Body 12 is necked down at 18 to define bait compartment 20 and weight compartment 22. In the preferred embodiment, body 12 is necked down at 18 by way of a knot 24 tied in the tubing. Body 12 has open ends 14 and 16 at opposite ends. Open ends are cinchable to contain their respective contents by drawstrings 30 and 32 respectively. Alternative closure means such as wires, clips, or additional knots are used in alternative embodiments. The tubular body is connected to the line of a fishing rod, or to any type of retrieval line, by a clip 36 connected to drawstring 30. In alternative embodiments, the retrieval line could be connected to the tubular body at any other location without departing from the scope of the invention.

In use, bait 38 is inserted through opening 14, which is then closed by cinching drawstring 30. A weight 40 is placed into the weight compartment through opening 16, which is cinched by drawstring 32. The retrieval line is then attached to clip 36, and the trap is dropped into the water. Crabs attracted to the trap by the bait try to reach the bait by inserting their claws into the bait compartment through the openings in the netting. The openings in the netting are sized so that the crab's claw will fit only partially through the openings. As the crab tries to push its claw further into the opening, it becomes stuck. If the crab then tries to flee the trap, it finds its claw is caught in the netting. The harder the crab pulls, the tighter the netting holds its claw. The resilient netting thereby provides a second means for ensnaring the crab. Even if the crab ultimately succeeds in extracting its claw from the resilient netting, the crab's speedy flight from the trap has been thwarted. The crab's involuntary delay while it attempts to extricate its claw provides more time for the snares to close around the crab's legs, and increases the chances that the crab will not escape. The present invention thereby provides a second, independent means of ensnaring the crab, and at the same time it overcomes the principal shortcoming of known crab traps which rely exclusively on line snares.

The description of my invention in terms of the foregoing embodiments is illustrative only, and is not intended to limit the scope of the invention. The trap is also suitable for catching other crustaceans such as crayfish and lobsters. Those skilled in the art will recognize that numerous changes and modifications in materials and details can be made without departing from the scope of the following claims.

I claim:

1. An improved crab trap comprising:
   a tubular member formed of a resilient, foraminous material, tubular member having a bait compartment;
   an opening formed in the bait compartment for receiving bait, the bait compartment opening comprising a first end of the tubular member, and a drawstring engaged with the tubular member and operable to cinch the bait compartment opening;
   a snare comprising a line having a first end portion connected to the tubular member, a central portion, and a second end portion slidably connected to the central portion; and
   a retrieving line attached to the tubular member.

2. An improved crab trap according to claim 1 wherein the tubular member further comprises a weight engaged with the tubular member.

3. A crab trap according to claim 2 wherein the tubular member defines a weight compartment, and the weight engaged with the tubular member comprises a weight disposed within the weight compartment.

4. An improved crab trap according to claim 3 further comprising the weight compartment having an operable opening, the weight compartment opening comprising a second end of the tubular member and a drawstring engaged with the tubular member, the drawstring operable to cinch the weight compartment opening.

5. A crab trap according to claim 1 further comprising a plurality of snares, each said snare having a first end portion connected to the crab trap, a central portion, and a second end portion slidably connected to the central portion.

6. A crab trap according to claim 1 wherein the foraminous material is selected to have openings sized to receive and engage a crab's claw.

7. A crab trap according to claim 1 further comprising a plurality of snares, each said snare having a first end portion connected to an upper portion of the crab trap, a central portion, and a second end portion slidably connected to a lower portion of the crab trap.

8. A crab trap according to claim 2 wherein the foraminous material is selected to have openings sized to receive and engage a crab's claw.

* * * * *